Patented May 6, 1947

2,420,234

UNITED STATES PATENT OFFICE 2,420,234

PURIFICATION OF LACTIC ACID

Edward M. Filachione, Philadelphia, and Charles H. Fisher, Abington, Pa., assignors to United States of America, as represented by Claude R. Wickard, Secretary of Agriculture, and his successors in office No Drawing. Application May 27, 1944, Serial No. 537,664

12 Claims. (Cl. 260—535)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the purification of hydroxy carboxylic acids and the production of hydroxy esters from impure aqueous solutions of hydroxy acids, and more particularly to the preparation of lactic esters and the purification of lactic acid.

Lactic acid as it occurs in the fermentation liquor is inexpensive, but as yet no completely satisfactory and low-cost method for purifying lactic acid or converting crude dilute lactic acid into its methyl ester has been developed. It is particularly desirable to have efficient methods for converting crude lactic acid into its methyl ester because pyrolysis of the acetyl derivative of methyl lactate yields methyl acrylate, a valuable synthetic rubber and resin intermediate (Smith and coworkers, Ind. Eng. Chem. 34, 473 (1942)), and lactic acid can be purified conveniently by distillation of its methyl ester followed by hydrolysis (Smith and Claborn, Ind. Eng. Chem. News Ed. 17, 641 (1939)). It has been proposed to purify lactic acid by distillation, but this method is difficult because lactic acid condenses with itself to form non-volatile polyesters (Watson, Ind. Eng. Chem., 32, 399 (1940)). The purification of lactic acid by extraction is difficult because the solubility characteristics of lactic acid are similar to those of water. The zinc salt of lactic acid which is relatively insoluble, can be used conveniently on a small scale to purify lactic acid, but purification of lactic acid as the zinc salt is disadvantageous on a commercial scale because some of the salt remains dissolved in the filtrate and inconvenient and expensive filtration operations are required.

An object of the present invention is to provide a new, efficient, and low-cost method for purifying lactic acid.

A further object is to provide a method for preparing methyl lactate from crude aqueous solutions of lactic acid.

A further object is to simplify the production of lactic acid of high quality, eliminate some of the present steps of the purification and make possible the manufacture of pure lactic acid derivatives at low cost.

Further objects and advantages of the invention will appear hereinafter.

We have found that lactic acid can be removed from its crude solutions by passing alcohol vapors through the solution and withdrawing and condensing the vapors or passing the mixture of vapors into a continuous still to separate the alcohol from the alkyl lactate and water. Although the lactic acid is removed from its crude solutions almost quantitatively by the stream of alcohol vapors either as lactic acid or its esters, the impurities such as inorganic salts, proteins and carbohydrates remain behind. We have also found that lactic acid can be esterified in its crude dilute solutions by means of a stream of alcohol vapors and that the ester distills over in the stream of alcohol vapors along with the water and some lactic acid. The condensate can be distilled or otherwise treated to isolate the lactic ester and the purified lactic acid. If desired, entraining agents may be used to separate the components of the condensate by azeotropic distillation. The purified lactic acid can be converted easily into more of the ester or the ester may be hydrolyzed readily to lactic acid of excellent quality.

The crude lactic acid may be used either as the dilute aqueous solution obtained by liberation of the lactic acid from the fermentation liquor or the dilute aqueous lactic acid may be first concentrated to a convenient concentration preferably below 125 percent by weight of lactic acid. One advantage in first concentrating the dilute aqueous lactic acid solution lies in the fact that the more concentrated solution appears to react more rapidly with alcohol vapors than does the dilute solution. Furthermore, by first concentrating the dilute aqueous lactic acid, inorganic salts and other solid impurities are precipitated and can be removed by filtration, although this is not necessary for the operation of our process. We prefer to use a crude lactic acid solution of a concentration in the approximate range of 50 percent to 110 percent by weight of acid expressed as lactic acid, but other concentrations may be used.

In the purification, the alcohol vapors may be reacted with the crude lactic acid either in the presence or absence of esterification catalysts. In the absence of catalysts, the reaction is slower and a longer time is required to volatilize the lactic acid from the crude solution. Esterification catalysts that may be used include sulfuric acid, p-toluene sulfonic acid or other aryl sulfonic acids, boric acid, the boric acid complex resulting from alpha-hydroxy acids or polyhydric alcohols and boric acid, hydrogen chloride, hydrogen bromide, phosphoric acid, hydrogen fluoride, acidic salts such as zinc chloride, aluminum chloride, sodium bisulfate, and so forth.

We have found, however, that when boric acid is used as the esterification catalyst, some of the boric acid, as such or as a derivative, is carried over with the alcohol vapors. Hence, it may be advisable, in making certain grades of lactic acid, such as the edible grades, to purify the crude lactic acid in the absence of an esterification catalyst to avoid traces of this impurity and to treat the remainder of the crude with a catalyst as a source for some other grade. We have also found that in the case of some crudes the use of a larger amount of esterification catalyst results in improved amounts of lactic acid volatilized by the alcohol vapor.

A variety of alcohols may be employed in our process. For example, vapors of primary alcohols, such as methanol, ethanol, n-propyl alcohol, n-butyl alcohol, iso-butyl alcohol, n-amyl alcohol, iso-amyl alcohol, methyl cellosolve, ethyl cellosolve, methallyl alcohol, and allyl alcohol, may be used to volatilize the lactic acid from the crude. Vapors of secondary alcohols, such as iso-propyl alcohol, sec-butyl alcohol, and cyclohexanol, may also be employed. In cases where higher boiling alcohols are used, we prefer to operate under substantially reduced pressure so that the alcohol will boil in the range above 50° C. but below approximately 100° C. The alcohol vapors may be reacted with the crude lactic acid in the temperature interval above 50° C. but below 200° C. However, in the presence of esterification catalysts, we prefer to operate at a temperature above 75° C. but below 135° C.

The present invention has several advantages and represents a distinct improvement in the manufacture of lactic acid. Several steps of previous methods for purifying lactic acid and making lactic esters are made unnecessary by our process. For instance, it is not necessary to filter salts such as calcium sulfate, or precipitate and filter protein material, or use the activated carbon treatment. When it is desired to use decolorizing carbon, however, the carbon may be employed prior to alcohol vapor treatment or with the condensate produced by the alcohol vapor operation. Extraction with organic solvents is not required, and it is not necessary to remove all the water as is the case in the production of sodium or calcium lactate. Another advantage is that a one-step process, which may be operated continuously, is provided for recovering lactic acid of high purity from acidified fermentation liquors, or for converting crude lactic acid into its esters.

Our invention is illustrated by the following examples:

EXAMPLE I

To 510 ml. of crude fermentation liquor containing 0.225 mole of calcium lactate, 23 g. of concentrated sulfuric acid was added, and then an excess of 0.5 ml. of concentrated sulfuric acid was added as a catalyst. This mixture, without filtering, was placed in a flask containing a delivery tube extending to the bottom of the flask and a take-off which was attached to a condenser. The mixture was immersed in a boiling water bath. Methanol vapor, produced by boiling methanol in another flask, was led in through the delivery tube. The exit vapors were condensed and the condensate, composed essentially of methanol, water, methyl lactate and small amounts of the hydrolysis products of the ester, was collected. This condensate was colorless. Saponification showed that over 75 percent of the lactic acid, as such or as its ester, was volatilized by the methanol vapor.

EXAMPLE II

A reaction tower was constructed of a glass tube, 1 inch in diameter and 4 feet long, and this was packed with ¼ inch Berl saddles. The top of the tower was provided with an inlet for introducing the crude lactic acid and an outlet tube for the removal of exit vapors from the tower. The base of the tower was provided with a side arm for introducing the alcohol vapor. The tower was heated electrically and the temperature was controlled and recorded automatically. The crude lactic acid, with or without an esterification catalyst, was fed in at the top of the tower and alcohol vapor was introduced at the base of the tower. The exit vapors from the tower, composed essentially of alcohol, water, and lactic ester, were led to a continuous stripping still and the major portion of alcohol was separated and automatically returned through a liquid seal to the alcohol vaporizer. The purified lactic acid solution, composed essentially of alcohol, water, lactic ester and lactic acid was collected at the base of the continuous stripping still. The purified lactic acid solution was then slowly distilled, adding more water when necessary, to hydrolyze the lactic ester and to remove the alcohol leaving a pure aqueous solution of lactic acid.

To 510 cc. of crude fermentation liquor containing 0.225 moles of calcium lactate, 23 g. of concentrated sulfuric acid was added, and then an excess of 0.5 ml. of concentrated sulfuric acid was added as a catalyst. The calcium sulfate was removed by filtration and the aqueous filtrate was concentrated until the lactic acid concentration was approximately 35 percent. This crude lactic acid solution was then introduced into the top of the tower described above at a temperature of 84° to 109° C. and methanol vapor passed countercurrently. After 4 hours and 40 minutes, over 88 percent of the lactic acid introduced into the tower was collected at the base of the stripping column as a product of high quality.

EXAMPLE III

The process was carried out with various crude grades of lactic acid furnished by a number of manufacturers used either as received or after concentration. The reaction was carried out in the tower described in Example II using various alcohols. Various conditions, such as catalyst, temperature, concentration, alcohol, and so forth, were investigated. For convenience, the results are presented in tabular form:

Purification of crude lactic acid by reaction with alcohol vapors in a packed tower

| Lactic acid | | | Alcohol used | Pressure | Catalyst | Tower temp., °C. | Time, hrs. | Available lactic acid | |
|---|---|---|---|---|---|---|---|---|---|
| Type (See Note) | Concentration, percent | Moles | | | | | | Volatilized, percent | Not volatilized, percent |
| A | 26 | 2.0 | Methanol | Atm | $H_2SO_4$ (2 ml.) | 95–105 | 8.1 | 95 | |
| A | 26 | 1.0 | ....do | Atm | $H_2SO_4$ (1 ml.) | 64–128 | 5.0 | 100 | |
| A | 26 | 1.0 | ....do | Atm | ....do | Ca.100 | 4.0 | 95 | |
| A | 26 | 1.0 | ....do | Atm | ....do | 98–125 | 3.7 | 82 | |
| A | 26 | 1.0 | Ethanol | Atm | ....do | 117–126 | 11.3 | 52 | |
| A | 26 | 1.0 | iso-Propyl | Atm | ....do | 118–127 | 2.8 | 91 | |
| A a | 56 | 2.0 | Methanol | Atm | $H_2SO_4$ (2 ml.) | 94–100 | 5.7 | 97 | |
| A b | 107 | 2.0 | ....do | Atm | ....do | 98–107 | 3.2 | 87 | 9 |
| A | 57 | 1.0 | ....do | Atm | $H_2SO_4$ (1 ml.) | 96–118 | 4.75 | 82 | 13 |
| B | 48 | 1.0 | Ethanol | Atm | ....do | 99–106 | 2.5 | 103 | |
| C c | 82 | 1.0 | Methanol | Atm | $H_2SO_4$ (0.25 ml.) | 102–113 | 3.75 | 97 | |
| C c | 82 | 1.0 | Ethanol | Atm | $H_2SO_4$ (0.5 ml.) | 97–108 | 7.0 | 86 | |
| C c | 82 | 1.0 | iso-Propyl | Atm | ....do | 97–108 | 4.0 | 78 | |
| C c | 82 | 1.0 | Methallyl | 110 mm | ....do | 94–104 | 3.0 | 96 | |
| D d | 81 | 1.0 | Methanol | Atm | $H_2SO_4$ (1 ml.) | 101–109 | 6.0 | 77 | 20 |
| D e | 91 | 1.0 | ....do | Atm | ....do | 101–108 | 2.67 | 85 | 15 |
| D | 91 | 1.0 | ....do | Atm | $H_2SO_4$ (2 ml.) | 91–108 | 3.0 | 92 | 9 |
| D | 91 | 1.0 | ....do | Atm | $H_2SO_4$ (3 ml.) | 92–106 | 2.7 | 94 | 9 |
| D | 91 | 1.0 | ....do | Atm | $H_2SO_4$ (4 ml.) | 96–107 | 4.75 | 78 | 19 |
| D | 91 | 1.0 | Ethanol | Atm | $H_2SO_4$ (1 ml.) | 96–107 | 6.0 | 78 | 16 |
| D | 91 | 1.0 | ....do | Atm | p-Toluenesulfonic acid (3.5 g.) | 97–109 | 9.9 | 59 | 40 |
| D | 91 | 1.0 | iso-Propyl | Atm | $H_2SO_4$ (1 ml.) | 95–107 | 4.0 | 69 | 26 |
| D e | 89 | 1.0 | Methanol | Atm | $H_3BO_3$ (2.5 g.) | 101–106 | 5.25 | 45 | 46 |
| D | 89 | 1.0 | iso-Amyl | 60–65 mm | $H_2SO_4$ (1 ml.) | 94–101 | 8.3 | 64 | 30 |
| D | 89 | 1.0 | Methanol | Atm | None | 121–127 | 5.0 | 76 | 16 |
| D | 89 | 1.0 | ....do | Atm | ....do | 144–154 | 4.0 | 82 | 13 |
| D | 89 | 1.0 | ....do | Atm | ....do | | | | |

Note.—The types indicated by letters in the table were crude grades of lactic acid furnished by the following manufacturers: A—Sheffield By-Products Co.; B—American Maize-Products Co.; C—E. I. duPont deNemours & Co., Inc.; D—Clinton Co.

a Sheffield's 26% crude lactic acid was concentrated by vacuum distillation to 56%.
b Sheffield's 26% crude lactic acid was concentrated by vacuum distillation to 107%.
c Edible grade.
d Technical grade.
e Clinton's 22% crude lactic acid was concentrated by removing water in vacuum and filtering off the precipitated solids.

EXAMPLE IV

A solution of 159 g. of a crude grade of lactic acid containing 56.5 percent lactic acid with 1 cc. of concentrated sulfuric acid was fed into the top of the tower described in Example II, and methanol vapor was fed into the bottom of the tower also as described in Example II. The purified lactic acid and esters collecting at the base of the stripping still were kept boiling to accomplish hydrolysis of the lactic esters during the run. The temperature of the tower was 98° to 107° C. The experiment required 3 hours and 10 minutes, at the end of which time 87 percent of the lactic acid in the crude had reacted with and was volatilized by the methanol and collected as a purified lactic acid solution of 57 percent concentration.

EXAMPLE V

A mixture of 98.5 g. (1 mole) of a crude 91 percent lactic acid solution containing 1 ml. of concentrated sulfuric acid was reacted with methanol vapor in the packed tower as described in Example II. The temperature of the tower was 101° to 109° C. and the reaction was carried out over a period of 6 hours. The purified solution which contained methyl lactate was then distilled in vacuum. There was collected 30 g. of methyl lactate boiling at 56° to 58° C. at 26 mm. of pressure.

Although several preferred procedures have been described, other modifications of the invention may be employed. Other materials, such as benzene or water, may be added to the alcohol and the vapors of the resulting mixture passed through the crude lactic acid. Esterification catalysts may be present in the lactic acid solution or may be added with the alcohol, or the process may be operated without the use of a catalyst. The process may be operated continuously or in batches, and various types of equipment may be used. Preliminary purification steps are not necessary before the treatment with the alcohol, but such preliminary steps may be carried out if desired. The condensate may be separated into its components by several methods. Either batch or continuous distillation methods may be used and entraining agents may be added to facilitate the distillation of any component. Extraction methods may be used to separate the lactic ester in the condensate from the water and free lactic acid. The starting material may contain monomeric lactic acid or mixtures of monomeric lactic acid with its condensation polymers (Watson, Ind. Eng. Chem. 32, 399 (1940)).

Having thus described our invention, we claim:

1. A process of recovering lactic acid from acidified aqueous fermentation liquors which comprises reacting an alcohol therewith by passing a stream of the alcohol vapor in countercurrent flow and in contact with the acidified fermentation liquor at a temperature in the range 50° C. to 135° C., removing a vapor mixture comprising the alcohol, water, and the lactate of the alcohol, and converting the lactate of the alcohol to lactic acid.

2. The process of claim 1 in which the alcohol is methyl alcohol, the temperature in the countercurrent contact step is in the range 75° to 135° C. and in which the contacting is in the presence of an acidic esterification catalyst.

3. The process of claim 1 in which the alcohol vapor is passed upwardly countercurrently to the fermentation liquor, the latter passing downwardly and being disposed in the form of a relatively extensive surface, compared with the volume.

4. The process of claim 3 in which the alcohol is methyl alcohol, the temperature in the contact step is in the range 75° to 135° C., and an acidic esterification catalyst is present.

5. The process described in claim 1 in which the alcohol is one having at least four carbon atoms, and in which the countercurrent contact operation is at a subatmospheric pressure.

6. The process described in claim 5 in which the subatmospheric pressure is such that the boiling point of the alcohol is in the range above 50° C. and below 100° C.

7. A process of recovering lactic acid from crude aqueous lactic acid comprising continuously flowing a body of crude aqueous lactic acid, disposed in form of a relatively extensive surface, compared with the volume of the aqueous acid, passing a stream of alcohol vapor in countercurrent contact with the so disposed aqueous acid, maintaining a temperature no higher than 200° C. in the contact step, removing a vapor mixture comprising the alcohol, water, and the lactate of the alcohol, and hydrolyzing the said lactate to lactic acid.

8. The process of claim 7 in which the alcohol is methyl alcohol, the temperature is in the range 50° to 135° C., an acidic esterification catalyst is present in the contact step, and the lactic acid is disposed in the form of multiple films.

9. The process of claim 7 in which the alcohol is one having at least four carbon atoms and in which a subatmospheric pressure is maintained in the contact step such that the boiling point of the alcohol is in the range above 50° C. and below 100° C.

10. A continuous process of esterifying an aqueous solution of crude lactic acid comprising continuously flowing a body of crude aqueous lactic acid disposed in the form of multiple liquid films, continuously passing a stream of an alcohol vapor in countercurrent contact with the so disposed aqueous acid, the temperature being in the range 50° to 135° C. in the contacting step, and removing a vapor mixture comprising water, the alcohol, and the lactate of the alcohol.

11. The process described in claim 10 in which the contacting is in the presence of an added acidic esterification catalyst.

12. The process described in claim 10 in which the crude lactic acid is fermentation liquor.

EDWARD M. FILACHIONE.
CHARLES H. FISHER.

REFERENCES CITED

The following references are of record in the file of this patent:

UNITED STATES PATENTS

| Number | Name | Date |
| --- | --- | --- |
| 321,925 | Waite | July 7, 1885 |
| 686,170 | Waite | Nov. 5, 1901 |
| 924,494 | Noerdlinger et al. | June 8, 1909 |
| 1,147,767 | Laszloffy | July 27, 1915 |
| 1,240,766 | Olson | Sept. 18, 1917 |
| 1,594,843 | Lawrie | Aug. 3, 1926 |
| 1,766,715 | Luther et al | June 24, 1930 |
| 2,013,104 | Macallum | Sept. 3, 1935 |
| 2,334,524 | Wenker | Nov. 16, 1943 |
| 2,350,370 | Schopmeyer et al. | June 6, 1944 |
| 1,160,595 | Gruter et al. | Nov. 16, 1915 |
| 1,421,604 | Steffens | July 4, 1922 |
| 2,029,694 | Bannister | Feb. 4, 1936 |

OTHER REFERENCES

Wislicenus, Liebig's Annalen, vol. 125, pp. 57–59 (1863).

Wuyts et al., Bull. Soc. Chem. Belg., vol. 29, pp. 61–65 (1918).